United States Patent [19]

Barnes

[11] Patent Number: 4,476,088
[45] Date of Patent: Oct. 9, 1984

[54] LATCHING DEVICES AND NUCLEAR REACTORS INCORPORATING SUCH LATCHING DEVICES

[75] Inventor: John G. Barnes, Blackburn, England
[73] Assignee: Nuclear Power Company Limited, London, England
[21] Appl. No.: 197,289
[22] Filed: Oct. 15, 1980
[30] Foreign Application Priority Data
  Oct. 30, 1979 [GB] United Kingdom ............... 7937489
[51] Int. Cl.³ ............................................. G21C 19/00
[52] U.S. Cl. ..................................... 376/347; 376/264; 376/268; 294/97; 411/341
[58] Field of Search ............... 376/233, 235, 327, 364, 376/, 347, 264, 268; 292/327; 81/436; 403/2; 464/32, 33; 411/340, 341, 342, 343; 294/86 A, 86.18, 97

[56] References Cited

U.S. PATENT DOCUMENTS

| | | | |
|---|---|---|---|
| 1,972,601 | 9/1930 | Regan | 464/33 X |
| 3,185,413 | 5/1965 | Walker | 403/2 X |
| 3,208,329 | 9/1965 | Copeland | 411/343 |
| 3,408,101 | 10/1968 | Savary | 376/233 |
| 3,994,775 | 11/1976 | Spurrier | 376/327 |
| 3,997,394 | 12/1976 | Aisch et al. | 376/438 |
| 4,185,477 | 1/1980 | Van der Lely et al. | 464/32 |
| 4,196,867 | 4/1980 | Miller | 464/33 X |
| 4,330,898 | 5/1982 | Thompson et al. | 403/2 X |

FOREIGN PATENT DOCUMENTS

| | | | |
|---|---|---|---|
| 866580 | 2/1953 | Fed. Rep. of Germany | 464/32 |
| 1061452 | 7/1959 | Fed. Rep. of Germany | 376/364 |
| 1140770 | 12/1962 | Fed. Rep. of Germany | 464/32 |
| 54-106785 | 8/1979 | Japan | 376/235 |
| 54-120390 | 9/1979 | Japan | 376/235 |
| 872092 | 7/1961 | United Kingdom | 376/233 |
| 1159971 | 7/1969 | United Kingdom | 376/364 |

Primary Examiner—Richard E. Schafer
Assistant Examiner—Daniel Wasil
Attorney, Agent, or Firm—William R. Hinds

[57] ABSTRACT

A latching device for use in nuclear reactors. The device is used to latch outer housing assemblies to the reactor core. The device contains a shear pin which does not break under normal loading imposed by movement of absorber rod assemblies, but which shears when it is desired to remove the housing from the core.

3 Claims, 5 Drawing Figures

LATCHING DEVICES AND NUCLEAR REACTORS INCORPORATING SUCH LATCHING DEVICES

BACKGROUND OF THE INVENTION

This invention relates to latching devices and to nuclear reactors incorporating such latching devices.

In one example of liquid metal cooled nuclear reactor construction, the reactor is submerged in a pool of coolant contained in a primary vessel. The primary vessel is housed in a concrete containment vault and is suspended from the roof of the vault. There is a leak jacket or catchpot surrounding the primary vessel for catching coolant in the event of leakage. The core is carried on a diagrid which depends from the roof of the vault by tie straps and the roof carries control rods which are vertically insertable into the core to control reactivity. The core includes absorber sub-assemblies for controlling or shutting down the reactor.

An absorber sub-assembly comprises two components, an outer housing assembly and an absorber rod assembly and in use the absorber rod assembly moves up and down inside the outer housing assembly.

SUMMARY OF THE INVENTION

An object of the present invention is to tend to provide a latching device and a nuclear reactor incorporating such latching devices whereby the absorber rod assembly can move up and down inside the outer housing assembly, without the latter becoming detached from the reactor core, except when detachment is desired.

According to one aspect of the present invention, a latching device comprises a first member carrying a pawl arrangement including a pivotally mounted pawl, a second member having a face for co-acting with the pawl to latch the first member to the second member, the pawl arrangement including a load sensitive element for yielding under a preselected load to alow the first member to be detached from the second member. Preferably, the load sensitive element comprises a shear pin.

Conveniently, the pawl of the pawl arrangement is resiliently biased to interact with the face of the second member. Advantageously, the pawl includes a camming surface for interacting with a cooperating surface on the second member to permit latching of the members.

According to another aspect of the present invention, a nuclear reactor comprises a core including a core support structure and a plurality of absorber sub-assemblies, each sub-assembly comprising an absorber rod assembly and an outer housing assembly, the outer housing assembly carrying a pawl arrangement including a pivotally mounted pawl, the core support structure having a face for co-acting with the pawl to latch the outer housing assembly to the core support structure, the pawl arrangement including a load sensitive element for yielding under a preselected load to allow the sub-assembly to be detached from the core support structure.

BRIEF DESCRIPTION OF THE DRAWINGS

An embodiment of the present invention will now be described by way of example only with reference to the accompanying drawings in which.

DESCRIPTION OF THE PREFERRED EMBODIMENT

Figure 1:
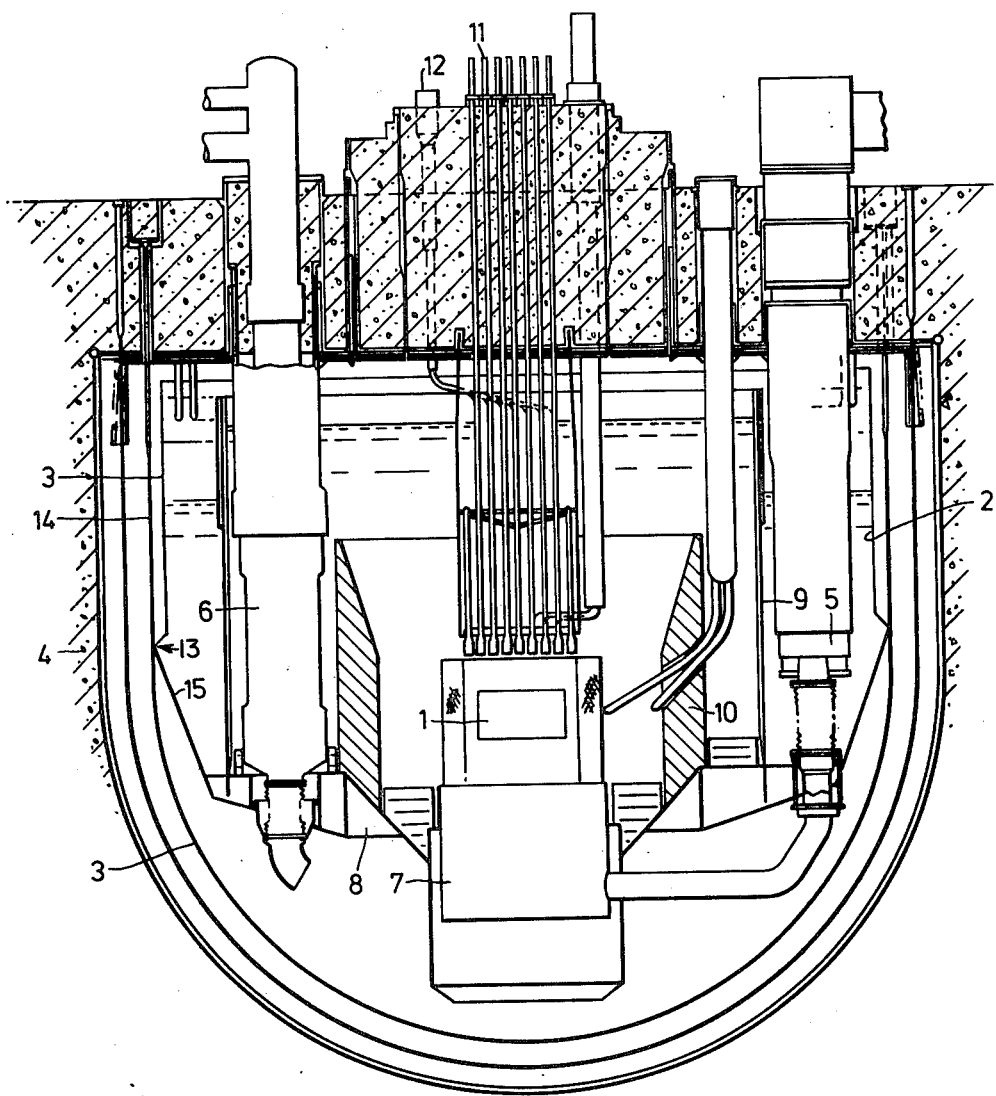
FIG. 1 is a diagrammatic vertical section of a nuclear reactor.

Reference is made firstly to FIG. 1, wherein there is shown a liquid metal cooled fast breeder nuclear reactor of the pool kind having a core or fuel assembly 1 submerged in a pool 2 of liquid sodium coolant in a primary vessel 3. The primary vessel is open at the top and is suspended from the roof of a containment vault 4 and there are provided a plurality of coolant pumps 5 and heat exchangers 6, only one of each of the pumps and heat exchangers being shown. The fuel assembly 1 is mounted on a diagrid 7 and is supported by a strongback 8. The fuel assembly 1 is housed with the heat exchangers in an inner tank 9 whereas the pumps 5, which deliver coolant to the diagrid, are disposed outside of the inner tank. The fuel assembly 1 comprises a plurality of sub-assemblies which upstand from the diagrid in closely spaced side-by-side array and the fuel assembly is surrounded by a neutron shield 10. Control rods 11 and instrumentation 12 penetrate the roof of the vault. The control rods, that is absorber rod assemblies of one type, move up and down inside respective housing assemblies in the core 1. The attachment of the housing assemblies, which are cylindrical in the vicinity of the core attachment and of generally hexagonal cross-section elsewhere, is by means of respective latching devices to core support structure as described below with reference to FIGS. 2 to 5. It is clearly important that the housing assemblies do not become detached from the core in operation and can only be detached when it is necessary to change them.

In operation of a nuclear reactor, relatively cool coolant drawn from the region of the pool outside of the core tank by the pump 5, is passed upwardly through the fuel assembly in heat exchange therewith by way of the diagrid 7, thence through the heat exchanger 6 to be discharged back into the outer region of the pool. A secondary coolant is flowed from outside the vault through the heat exchanger in heat exchange with the pool coolant thence to steam generation plant (not shown in the drawings).

The primary vessel 3 incorporates an annular yoke 13 fabricated from arcuate segments, the yoke being suspended from the roof structure of the vault by a first annular series of tie straps 14 disposed outside the vessel. The fuel assembly and strongback and supported from the yoke by a second series of tie straps 15.

Figure 2:
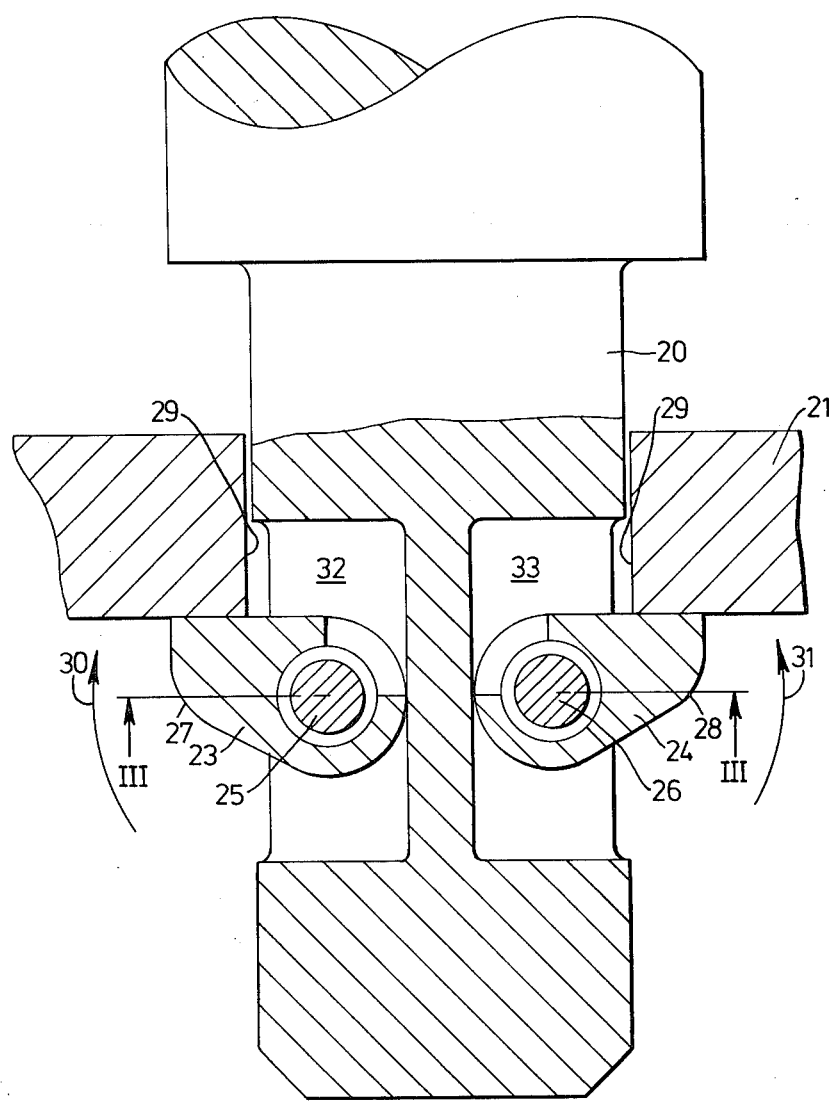
FIG. 2 is a vertical section of a latching part of a control rod housing and core support structure.

Reference is now made to FIG. 2, in which one of the previously mentioned control rod outer housing assemblies is generally indicated by 20. Part of the reactor core support structure is indicated by 21. The control rod outer housing assembly 20 carries pawl arrangements including pawls 23 and 24 on pivot pins 25 and 26, respectively. The pivot pins 25, 26 are secured to the assembly 20 and cannot themselves rotate. Torsion springs (not shown in this figure) are located in annular spaces between the pawl and respective pins. As the outer housing assembly is inserted into the core support structure, camming surfaces 27, 28 on the pawls 23, 24 respectively co-operate with the support structure upper surface and inner walls 29 to cause the pawls 23, 24 to rotate in directions indicated by arrows 30, 31 respectively into cavities 32, 33 respectively in the assembly 20, thereby allowing the assembly 20 to be inserted into the structure 21. The pawls rotate in an opposite sense to that of arrows 30, 31 under the action of the above-mentioned springs, when through the structure 21. The pawls then interact with the lower face of structure 21 to prevent the assembly 20 being pulled upwards through the structure, ie the assembly 20 is latched into the structure 21.

Figure 3:
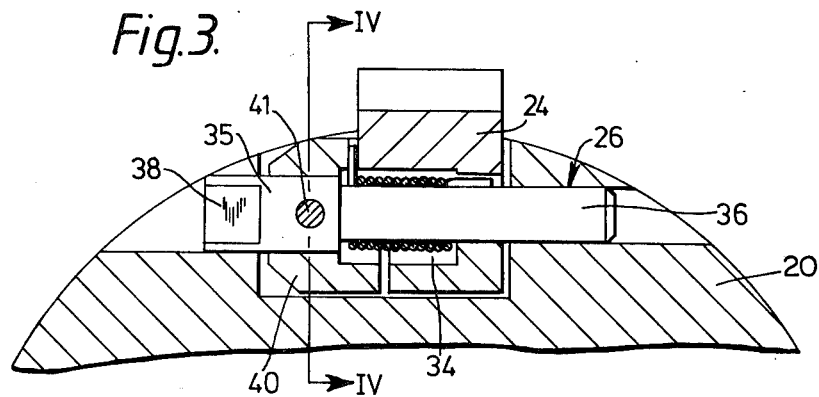
FIG. 3 is a part section on III—III of FIG. 2.

Reference is now made to FIG. 3, wherein like reference numerals to FIG. 2 are used for like parts. In FIG. 3, the previously mentioned spring is indicated by 34. The pivot pin 26 comprises a large diameter shank 35 and a pivot portion 36 upon which the spring 34 is fixed and about which the pawl 24 pivots. The pivot pin is longitudinally located in the housing assembly 20 by a key 38. Rotation of the pawl 24 about the pivot pin is inhibited opposite to arrow 31 by a bearing member 40. The bearing member 40 is located in the cavity 33 on the pivot pin 26 and is secured thereto by a shear pin 41.

Figure 4:
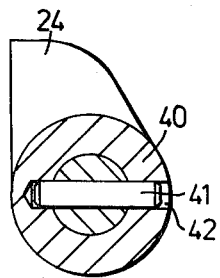
FIG. 4 is a detached view constituting an incomplete section on IV—IV of FIG. 3.
Figure 5:
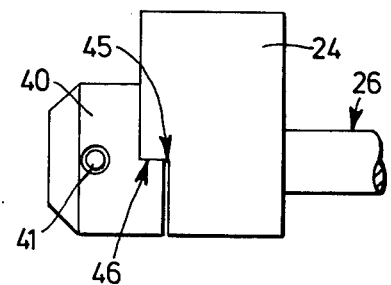
FIG. 5 is a detached view constituting an inverted plan of a pawl arrangement as shown in FIGS. 2, 3 and 4.

Reference is now made to FIGS. 4 and 5, wherein like reference numerals to FIGS. 2 and 3 are used for like parts. The shear pin 41 can be seen more clearly in FIG. 4, wherein it is shown in a blind bore 42 in the bearing member 40. From FIG. 5, co-acting surfaces 45, 46 between the pawl 24 and bearing member 40 can be seen. If the pawls are urged opposite to the arrows 30, 31 then the co-acting surfaces prevent the pawl rotating with respect to the member 40. However, if sufficient force is applied to shear the shear pin 41, then the pawl 24 and bearing member 40 rotate together so that the pawl moves into the cavity 33 to permit the assembly 20 to be detached from the structure 21. It will be appreciated that the pawl 23 is constructed in a pawl arrangement with respect to the housing assembly similar to that pawl 24.

In operation, the control rod outer housing 20 is inserted into the structure 21 and latched therein by the pawls 23 and 24. As a nuclear reactor operates, a control rod (not shown in FIGS. 2 to 5 but see 11 in FIG. 1) moves up and down within the housing 20. The control rod exerts longitudinal compressions and tensions on the housing 20, but the latter cannot be pulled out of the structure 21 because the tensions are not great enough to shear the pin 41. Operational shearing stresses are calculated in advance and only pins of sufficient resistance to shear under the operating tensions are used.

When, however, it is necessary for overhaul, repair and maintenance that the housing assembly 20 be removed from the core, ie detached from the structure 21, then a greater tension is exerted on the housing, which is transmitted via the lower face of the structure 21 to the pawls 23, 24. This tension is great enough to shear the pin 41 between the pivot pin 26 and bearing member 40 so that the pawl 24 rotates with the bearing member opposite to arrow 31 until the pawl is within the profile of the assembly 20. In this way, the assembly 20 can be detached from the structure 21. The operation of the pawl arrangement including pawl 23 is similar to that including pawl 24 and as many arrangements can be used as are necessary. Other control rod housings in the reactor core are attached in the same way. A similar latching arrangement can be used on the core and radial breeder sub-assemblies to prevent inadvertent removal of an adjacent sub-assembly when withdrawing a sub-assembly.

It is to be understood that absorber sub-assemblies is a generic term which includes all absorber sub-assemblies contained in the core. Thus control rods, primary shutdown rods and alternative shutdown rods are included in the term. A control rod, as described above, moves up and down in operation. A primary shutdown rod is similar to the control rod except that the absorber rod assembly is held out of the core region until required for use and does not move up and down as the control rod. When required for use, the absorber rod assembly is released and drops fully into the core. An alternative shutdown rod comprises an outer housing assembly which is outwardly similar to the out housings used for the control and primary shutdown rods. The absorber rod assembly is held out of the core region by hydraulic balance, the sodium circuit for which is separate from the main reactor circuit. The absorber rod assembly will drop into the core region when the sodium supply to the alternative shutdown rod is cut.

From the above description, it can be seen that the present invention provides a latching means which is not detached under normal operational loads on absorber sub-assemblies of a nuclear reactor and yet provides a nuclear reactor wherein detachment of such absorber sub-assemblies for repair or replacement is facilitated.

What I claim is:

1. A nuclear reactor having a core including a stationary core support structure and a plurality of absorber sub-assemblies, each said sub-assembly comprising an absorber rod assembly operable from above the core and an outer housing assembly, each outer housing assembly having at least one pawl pivotally mounted thereon, a face on the core support structure for coacting with each pawl to latch each outer housing assembly to the core support structure, and a mechanical load sensitive element associated with each pawl for shearing on the exceeding of a preselected force of withdrawal of an outer housing assembly from the core support structure and effecting unlatching to permit withdrawal of the respective outer housing assembly from the core support structure, said preselected withdrawal force comprising a mechanical force directed from above, being in excess of that required to move the absorber rod assembly within the housing assembly, and acting in an upward direction so as to free the housing assembly for removal from the core.

2. A latching device for effecting engagement between two members and disengagement therebetween on the exceeding of a preselected withdrawal force between the two members in a disengaging direction, such device including a pawl pivotally mounted on the first member, a face on the second member for coacting with the pawl to latch the first member to the second member, and a mechanical load sensitive element associated with the pawl for yielding in response to the exceeding of said preselected withdrawal force and effecting unlatching of the members to permit withdrawal one from the other, said pawl being rotatably mounted on a pivot pin mounted non-rotatably on said first member, rotation of said pawl on said pivot pin being limited by engagement with a bearing member mounted non-rotatably on said pivot pin by a shear pin which constitutes said load sensitive element and which is constructed so as to yield on the exceeding of said withdrawal force so that the bearing member is freed and ceases to limit the pivotal movement of said pawl, thus allowing withdrawal of one member relative to the other.

3. In a nuclear reactor having a core including a core support structure and a plurality of absorber sub-assemblies, each said sub-assembly comprising an abosrber rod assembly operable from above the core and an outer housing assembly, the improvement comprising a latching device for effecting engagement between the housing assembly and the core support structure and disengagement therebetween on the exceeding of a preselected withdrawal force between the housing assembly and the core support structure in a disengaging direction, said preselected withdrawal force being a mechanical force directed from above, being in excess of that required to move the absorber rod assembly within the housing assembly, and acting in an upward direction so as to free the housing assembly for removal from the core, such device including a pawl pivotally mounted on the housing assembly, a face on the core support structure for coacting with the pawl to latch the housing assembly to the core support structure, and a mechanical load sensitive element associated with the pawl for breaking in response to the exceeding of said preselected withdrawal force and effecting unlatching of the housing assembly to permit withdrawal thereof from the core.

* * * * *